US006401386B1

(12) United States Patent
Ko

(10) Patent No.: US 6,401,386 B1
(45) Date of Patent: Jun. 11, 2002

(54) EFFICIENT PROCESS FOR BULB AND FLOWER PRODUCTION

(76) Inventor: Nan-Jing Ko, 13735 NW. 39th Ave., Gainesville, FL (US) 32606

( * ) Notice: Subject to any disclaimer, the term of this patent is extended or adjusted under 35 U.S.C. 154(b) by 0 days.

(21) Appl. No.: 09/404,027

(22) Filed: Sep. 23, 1999

(51) Int. Cl.⁷ .................................................. A01C 1/02
(52) U.S. Cl. ...................................................... 47/58.1
(58) Field of Search ................................ 47/58.1, 65.8, 47/66.7, 73, 74, 77, 84, 65.9, DIG. 3; 800/DIG. 67

(56) References Cited

U.S. PATENT DOCUMENTS

| | | | | |
|---|---|---|---|---|
| 3,775,903 A | * | 12/1973 | Pike | 47/65.8 |
| 3,961,444 A | * | 6/1976 | Skaife | 47/79 |
| 4,570,379 A | * | 2/1986 | Oglevee et al. | 47/58 |
| 5,058,318 A | * | 10/1991 | Tammen | 47/58 |
| 5,138,794 A | * | 8/1992 | Roh | 47/58 |
| 5,287,651 A | * | 2/1994 | Graaf | 47/65.9 |
| 5,331,908 A | * | 7/1994 | Loeb | 111/114 |
| 5,761,847 A | * | 6/1998 | Ito et al. | 47/65.8 |

FOREIGN PATENT DOCUMENTS

WO          00/48457   *   8/2000   ............ A01G/9/10

* cited by examiner

*Primary Examiner*—Peter M. Poon
*Assistant Examiner*—Son T. Nguyen
(74) *Attorney, Agent, or Firm*—Saliwanchik, Lloyd & Saliwanchik

(57) ABSTRACT

The subject invention provides materials and methods for the efficient and economical production of flowering plants from bulbs. Using the procedures described herein, it is possible to produce large numbers of healthy plants from bulbs or even seeds in a timely fashion. Specifically, bulbs or seeds are placed in at least one growth tray and stored in a cool environment. Such environment induces plant growth in roots and shoots. Once the roots and shoots of the plants form an interwoven cluster on the interior bottom surface of a growth tray, the plant clusters and the growth tray are removed from the cool environment and planted as a unit in soil to grow to maturity.

18 Claims, 2 Drawing Sheets

(2 of 2 Drawing Sheet(s) Filed in Color)

EFFICIENT PROCESS FOR BULB AND FLOWER PRODUCTION

BACKGROUND OF THE INVENTION

There are many types of plants which are grown primarily because the plants produce attractive flowers. Often, people will buy young plants, or even seeds or bulbs, which are then grown into flowering plants. In other situations, large numbers of plants are grown commercially and are then sold to consumers when the plants begin to produce flowers. Alternatively, the commercial plant growers may cut the flowers from the plants and sell the cut flowers to florists or directly to the consumers.

Many popular flowering plants are grown from bulbs. Examples of the flowering plants which are grown from bulbs include lilies, tulips, daffodils, hyacinths, narcissus, calla lilies, gladioli, amaryllis, and caladiums.

Lilies are one particularly popular type of flowering plant grown from bulbs. Several species of Lilium have become increasingly popular as flowering pot plants and cut flowers. Easter lilies (*Lilium longiflorum*) have been historically used at Easter and other religious occasions. Cultivars of other Lilium species and hybrids have become even more important in the market place. The so-called Asiatic hybrids and Oriental hybrids, among others, are also very important.

Lilies are grown from bulbs which, in nature, typically go through a two-to-three year growth cycle before they can be induced to flower. A typical bulb growing cycle is as follows. In the first year the bulb grower starts with the scales of a mother bulb and sows the scales in a row. The scales grow into bulblets of one to three inches in circumference with the bulblets having a small root system and shoots. In the fall of the year, the bulblets are dug up and thereafter sorted, cleaned and graded. During this process many of the roots and shoots are removed. In the spring of the second year, the bulblets are planted in a field or green house and grown so as to increase in size. The bulblets are now referred to as bulbs, or yearlings. The average size of the bulbs at the end of the second year is three inches to seven inches in circumference, with some of the larger ones being ready to sell. Again, in the fall the bulbs are dug up, cleaned, and graded and during this process many of the roots and shoots are again removed. In the third year, the bulbs are planted in the field or green house in the spring and they continue to enlarge to about seven to ten inches in circumference at which time they are dug up and ready to go on the market.

The inducing procedure usually involves a low temperature vernalization treatment which induces flower initiation. Easter lilies, in general, are forced to flower once each year for the Easter holiday. Asiatic, Oriental, and other lilies are forced to flower year round. In order to achieve year-round flowering, bulbs are vernalized and frozen until needed. The longer the period of time the bulbs are frozen, the lower the number of flowers per bulb.

Many of the lily bulbs which are produced are sold to large commercial growers. These growers then produce potted plants or cut flowers for sale to florists and/or the ultimate consumer. Growth of lilies is challenging because they need proper conditions and are susceptible to diseases and pests. Current procedures typically require the use of extensive amounts of fertilizer and/or pesticides. Many of the lilies are grown in greenhouses under controlled conditions, but this procedure is labor intensive, expensive and time-consuming. There remains a need in the art for a more efficient procedure for producing potted lily plants and cut flowers. Preferably, such a procedure could be applied to other plants grown from bulbs and seeds.

Commercial production of bulbs, pot plants, and cut flowers often requires the application of substantial quantities of pesticides. One of the most commonly used pesticides for these purposes is methyl bromide. However, methyl bromide has been identified as an environmental hazard and its removal from the market is anticipated within the next 5 years. Without methyl bromide growth of bulb plants using traditional methods will be even more difficult and costly due to pest damage. Advantageously, the methods of the subject invention eliminate the need for methyl bromide and other such pesticides. The subject invention is additionally advantageous because it can be mechanized thereby enhancing consistency and efficiency.

BRIEF SUMMARY OF THE INVENTION

The subject invention pertains to materials and methods for easily and efficiently growing flowering plants from bulbs. Specifically exemplified herein is a process for the efficient production of lilies. The methods described herein can be applied to various types of lilies as well as to other plants grown from bulbs or even seeds.

In a specific embodiment of the process of the subject invention, an important component of the process is a unique and advantageous growth tray. The growth trays of the subject invention are particularly advantageous because they facilitate the efficient production of large numbers of healthy plants. Typically, the growth trays of the subject invention are rectangular or square and are made from plastic or other such material which is not degraded by water. In a preferred embodiment, the growth trays of the subject invention have small holes in the bottom of the tray to allow water to flow through without the loss of soil. Alternatively, the trays may be lined with, or made from, a porous material.

In an initial step in the process of the subject invention, soil having nutrients and an appropriate moisture content is placed in the growth tray. Bulbs are then uniformly placed throughout the tray. Bulbs for a desired plant, such as lilies, are then covered with soil which can be watered as necessary to achieve the proper moisture content in soil.

The trays with bulbs are then stored. Storage is preferably done in a thermostatically controlled environment at a cool temperature. The cool temperature helps maintain the moisture content of the soil and promotes proper development of the bulbs.

While in storage, the bulbs are induced to grow using standard methods known to those skilled in the art, for inducing growth.

During this growth process, roots begin to form on the bottom of the growth trays. Over a period of time, the roots will intertwine with each other, forming a thatch on the interior bottom surface of the growth tray. The intertwining of the individual bulb roots transforms the individual bulbs in the growth trays into a woven bulb cluster.

Once the woven bulb cluster has formed, the bulb clusters can be removed from the thermostatically controlled environment to a replanting area where the plants can grow to maturity. This replanting area may be a greenhouse but, advantageously can also be an open field.

In a preferred embodiment of the subject invention, the interwoven bulb cluster remains in the growth tray when the bulbs are transferred to the area where the plant will grow and flower. This procedure minimizes handling of the bulbs thereby reducing costs and promoting efficiency and consistency.

After the bulb clusters are transferred to their new location, typically, the bulb clusters will begin flowering within about 1 to 3 months. As those skilled in the art will appreciate, the time to flowering will depend upon variety and temperature. The flowers are typically ready to be harvested within about 1 to 3 months.

The file of this patent contains at least one drawing executed in color. Copies of this patent with color drawings will be provided by the Patent and Trademark Office upon request and payment of the necessary fee.

BRIEF DESCRIPTION OF THE DRAWINGS

The file of this patent contains at least one drawing executed in color. Copies of this patent with color drawings will be provided by the Patent and Trademark Office upon request and payment of the necessary fee.

DETAILED DISCLOSURE OF THE INVENTION

Figure 1:
FIG. 1 shows intertwined bulb clusters produced by the method of the subject invention.
Figure 2:
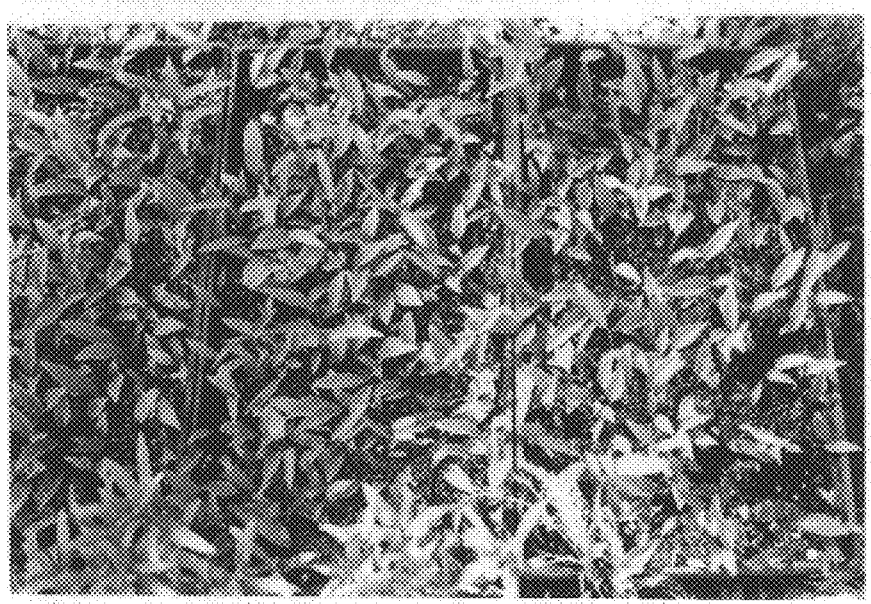
FIG. 2 shows healthy lily plant shoots produced by bulbs grown as described herein.
Figure 3A:
FIGS. 3A–C show lily plants and flowers grown according to the procedures of the subject invention.
Figure 3B:
Figure 3C:

The subject invention provides materials and methods for easily and efficiently growing plants from bulbs. Advantageously, the methods of the subject invention make it possible to grow plants from bulbs in a relatively short period of time and outside the usual growing season. The methods described herein can be applied to a wide range of bulb plants; however, specifically exemplified herein are methods for growing lilies. Advantageously, in the proper climate, the methods of the subject invention can be used to grow healthy plants in all different seasons of the year without the need to utilize costly greenhouse space.

The growth process of the subject invention begins with the placement of bulbs into growth trays. The growth trays used according to the subject invention are typically square or rectangular and can be, for example, from about 12 inches to about 30 inches or more on each side. In a specific embodiment, the growth trays are about 14 inches by about 22 inches. In one embodiment, the trays can be adapted to be stacked, thereby saving space. The trays can be from about 2 inches to about 10 inches deep, depending upon the size of the bulbs which will be gown. In a specific embodiment, the trays are about 4 inches deep. The trays are preferably constructed from a rigid, durable material which can hold soil without being degraded or easily damaged from moisture, handling, transport, or stacking. If the trays are to be stacked, they can be separated by plastic or other water impervious material which prevents water from passing from the upper trays to the lower trays. The plastic sheet can be soft or rigid and, preferably, is approximately the same size as the inner area of the growth tray. In addition to preventing water from flowing to the bottom tray(s), the sheet separating the trays prevents sprouts from the lower trays from going into the holes in the bottom of the higher tray(s).

In one embodiment of the subject invention, the rigid growth trays can be stacked upon a pallet or other similar support structure so that the trays occupy minimal space and can be readily moved in bulk.

Using the teachings provided herein, the skilled artisan could modify the exemplified procedures to use, for example, flexible bags until root growth occurs. Containers holding the plants could then be placed in a greenhouse or an open field for production of a pot plant such as an Easter Lily.

Using the teachings provided herein, the skilled artisan could modify the exemplified procedures for application to growing plants from seeds. In a preferred embodiment, seeds would be grown in rigid trays to facilitate automation of the process.

In a preferred embodiment, the growth trays of the subject invention have holes in the bottom of the tray to allow water to flow. Preferably these holes are sufficiently small so that water can flow through without the loss of soil. In an alternative embodiment, the holes in the bottom of the growth tray can be larger and the bottom of the trays lined with a porous material, such as cheese cloth, a fine wire or plastic mesh, or paper (newspaper quality) which holds soil but allows water to flow through.

The bulbs used according to the subject invention can be obtained from a commercial bulb supplier. In one embodiment, the bulbs used according to the subject invention can be used multiple times.

In one embodiment of the process of the subject invention a piece of paper, or other equivalent material, can be placed at the bottom of the growth tray. In a specific embodiment, the paper can be of newspaper quality. Next, soil is placed into the growth trays so as to fill the bottom of the trays. Then bulbs (or seeds) are placed in the trays on top of the soil layer. Next, additional soil is placed in the trays until the bulbs are covered so as to avoid exposure of the bulbs to the air. In a specific embodiment, the bulbs can be covered by about $1/8$ to about 1 inch of soil. The placement of soil and/or bulbs in the trays can be readily automated to enhance efficiency.

The soil which is used can be standard potting soil known to those skilled in the art. The soil will typically have nutrients appropriate for the plants which are to be grown. The bulbs are uniformly placed throughout the tray. The bulbs can be separated by about 1 to 3 inches (depending on the bulb size). For a growth tray of about 14 inches by about 22 inches there can be, for example, about 24 to 36 bulbs per tray. Once the bulbs are placed in the tray, they are completely covered with soil. Thus, the growth trays are essentially filled with soil containing the appropriate moisture and nutrients. As noted above, standard soils known and utilized in the art can be used to grow the bulbs.

The growth trays with bulbs contained therein are then stored in a controlled environment. Preferably, the temperature of the environment will be carefully controlled and maintained between about 35 and about 45° F. In a preferred embodiment, the temperature is maintained at about 40° F. The cool temperature helps maintain the moisture content of the soil and promote proper development of the bulbs. No light is necessary during this initial storage and growth phase of the process of the subject invention.

This initial storage and growth phase will typically last for about 1 to 4 months. The storage times will vary with the variety of bulb being grown. For example, the typical storage time for asiatic lilies is about 2–2½ months.

While in the thermostatically controlled environment, the bulbs are induced to grow using standard inducing methods well known in the art. During the induction process, roots begin to form in the soil. The bottom of the growth trays force the roots of the individual bulbs to intertwine with each other forming a thatch in the soil in the growth tray. The intertwining of the individual bulb roots transform the individual bulbs in the growth trays into an interwoven bulb cluster.

After the individual bulb roots have sufficiently intertwined to form the bulb clusters, the growth trays with bulbs are removed from the thermostatically controlled environment to a replanting area. The replanting area is typically a growth field or green house. In one embodiment, the bulb clusters can be removed from the growth trays and replanted completely covering the bulbs with soil. However, in a preferred embodiment, the bulb clusters are left in the growth trays which are then placed in a field or other open location where the plants begin their growth and maturation phase. This embodiment reduces handling thereby reducing costs and promoting efficiency.

After replanting, the bulbs will begin flowering in 1 to 3 months (depending on variety and climate). The flowers are typically ready to be harvested in about 2 to 4 months. Once flowers are cut and sold, the bulbs, if desired can be reused.

The process can also be used for growing mature bulbs from small bulblets. Usually, it will take 1 to 2 growing seasons to grow bulblets from scale to bloom sized bulbs. The process of the subject invention can be applied to the entire process from small bulblets to cut flower production, or pot plant production.

It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A method for growing plants comprising:
   a) placing bulbs or seeds in soil in at least one growth tray;
   b) storing said at least one growth tray in a cool environment maintained between 35° to about 45° F.;
   c) inducing the growth of plants in said cool environment;
   d) allowing the formation of roots and shoots of said plants in said cool environment, wherein said roots form an interwoven cluster in said cool environment; and
   e) exposing said interwoven cluster to a growth environment where the plants grow to maturity.

2. The method, according to claim 1, wherein said plants are grown from bulbs.

3. The method, according to claim 1, wherein said plants are lilies.

4. The method, according to claim 1, wherein said at least one growth tray has openings in the bottom which allow water to pass through but which substantially retain soil.

5. The method, according to claim 1, wherein said at least one growth tray is rigid.

6. The method, according to claim 1, wherein said at least one growth tray is a flexible bag.

7. The method, according to claim 1, wherein said at least one growth tray can be stacked.

8. The method, according to claim 7, wherein said at least one growth tray is stacked and said stacked growth trays are separated by plastic sheets.

9. The method, according to claim 1, wherein said plants are grown to maturity in an open field.

10. The method, according to claim 1, wherein flowers are harvested from said plants and are sold as cut flowers.

11. The method, according to claim 1, wherein methyl bromide is not used.

12. The method according to claim 1, wherein said cool environment is thermostatically controlled.

13. The method according to claim 1, wherein said cool environment is maintained at about 40° F.

14. A method for growing plants comprising:
    a) placing bulbs or seeds in soil in at least one container;
    b) storing said at least one container in a cool environment maintained at between 35° to about 45° F.;
    c) inducing the growth of plants in said cool environment;
    d) allowing the formation of roots and shoots of said plants in said cool environment, wherein said roots form an interwoven cluster in said cool environment; and
    e) exposing said interwoven cluster to a growth environment where the plants grow to maturity.

15. The method according to claim 14, wherein said cool environment is thermostatically controlled.

16. The method according to claim 14, wherein said cool environment is maintained at about 40° F.

17. A method for growing lily plants from bulbs comprising:
    a) placing bulbs or seeds in soil at least one growth tray, wherein said at least one growth tray can be stacked;
    b) storing said at least one growth tray in a cool environment maintained between about 35° to about 45° F.;
    c) inducing the growth of plants in said cool environment;
    d) allowing the formation of roots and shoots of said plants in said cool environment, wherein said roots form an interwoven cluster in said cool environment; and
    e) exposing said interwoven cluster to a growth environment where the plants grow to maturity.

18. A method for growing plants comprising:
    a) placing bulbs or seeds in soil at least one growth tray, wherein said at least one growth tray is a flexible bag;
    b) storing at least one growth tray in a cool environment maintained between about 35° to about 45° F.;
    c) inducing the growth of plants in said cool environment;
    d) allowing the formation of roots and shoots of said plants in said cool environment, wherein said roots form an interwoven cluster in said cool environment; and
    e) exposing said interwoven cluster to a growth environment where the plants grow to maturity.

* * * * *